(12) United States Patent
Pride et al.

(10) Patent No.: US 11,499,634 B1
(45) Date of Patent: Nov. 15, 2022

(54) GASKET SEAL FOR SPIN-ON FILTER HOUSING

(71) Applicants: Eric Cooper Pride, Nashville, TN (US); Derek Keith, Portland, TN (US); Jay Michael Cooper, Goodlettsville, TN (US)

(72) Inventors: Eric Cooper Pride, Nashville, TN (US); Derek Keith, Portland, TN (US); Jay Michael Cooper, Goodlettsville, TN (US)

(73) Assignee: Des-Case Corporation, Goodlettsville, TN (US)

( * ) Notice: Subject to any disclaimer, the term of this patent is extended or adjusted under 35 U.S.C. 154(b) by 935 days.

(21) Appl. No.: 15/978,226

(22) Filed: May 14, 2018

(51) Int. Cl.
*F16J 15/02* (2006.01)
*F16L 17/073* (2006.01)
*F16L 17/035* (2006.01)

(52) U.S. Cl.
CPC ......... *F16J 15/025* (2013.01); *B01D 2201/34* (2013.01); *B01D 2201/342* (2013.01); *F16L 17/035* (2013.01); *F16L 17/073* (2013.01)

(58) Field of Classification Search
CPC ....... F16L 17/035; F16L 17/06; F16L 17/073; F16J 15/025; F16J 15/061; B01D 2201/304; B01D 2201/34; B01D 2201/342; B01D 2201/347; Y10S 277/918
See application file for complete search history.

(56) References Cited

U.S. PATENT DOCUMENTS

| | | | | |
|---|---|---|---|---|
| 3,586,341 A * | 6/1971 | Whittaker | ................ | F16J 15/20 277/530 |
| 4,169,604 A * | 10/1979 | Heathcott | ................ | F16J 15/20 277/529 |
| 4,231,578 A * | 11/1980 | Traub | ...................... | F16F 9/363 277/572 |
| 6,189,894 B1 * | 2/2001 | Wheeler | .............. | F16J 15/3236 277/549 |
| 6,454,273 B1 * | 9/2002 | Kashima | ................ | F16J 15/164 277/437 |
| 6,588,602 B1 * | 7/2003 | McKenzie | ............. | B01D 27/08 210/443 |
| 7,229,102 B2 * | 6/2007 | Kubala | ................ | B23Q 11/103 277/530 |
| 7,828,302 B2 * | 11/2010 | Hurlbert | ................ | F16J 15/125 277/637 |
| 8,152,876 B2 * | 4/2012 | Gillenberg | ............. | B01D 45/12 55/337 |
| 8,205,890 B2 * | 6/2012 | Sundararajan | ........... | F16J 15/28 277/339 |
| 8,869,991 B2 * | 10/2014 | McKenzie | ............. | B01D 35/30 210/450 |
| 9,861,917 B2 * | 1/2018 | McKenzie | ............. | B01D 27/08 |
| 10,274,113 B2 * | 4/2019 | Hartmann | ............ | F16J 15/3236 |

(Continued)

*Primary Examiner* — Nicholas L Foster
(74) *Attorney, Agent, or Firm* — Patterson Intellectual Property Law, P.C.; Ryan D. Levy (57) ABSTRACT

Briefly, the present invention relates, in one embodiment, to a gasket for sealing a filter housing to a filter mount. The gasket may have an upper body and a lower body which seals between the filter housing and filter head. The gasket may include chamfered surfaces to allow for properly sealing against manufacturing tolerances, and may include an annular groove which receives the filter housing and stabilizes the gasket during installation.

16 Claims, 5 Drawing Sheets

(56) References Cited

U.S. PATENT DOCUMENTS

| | | | |
|---|---|---|---|
| 2005/0077231 A1* | 4/2005 | Bhardwaj | B01D 35/306 210/450 |
| 2006/0091064 A1* | 5/2006 | Brown | B01D 46/527 210/450 |
| 2009/0045592 A1* | 2/2009 | Hurlbert | F16J 15/125 277/628 |
| 2010/0270745 A1* | 10/2010 | Hurlbert | F16J 15/121 277/312 |
| 2011/0303604 A1* | 12/2011 | McKenzie | B01D 35/30 210/350 |
| 2015/0041387 A1* | 2/2015 | McKenzie | B01D 27/08 210/435 |
| 2016/0319936 A1* | 11/2016 | Dubois | F16J 15/32 |

* cited by examiner

GASKET SEAL FOR SPIN-ON FILTER HOUSING

A portion of the disclosure of this patent document contains material that is subject to copyright protection. The copyright owner has no objection to the reproduction of the patent document or the patent disclosure as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a gasket for making a fluid seal between a filter housing and a filter head. More particularly, this invention pertains to a gasket for use with a spin-on style filter housing that reduces the likelihood of the gasket being dislodged during installation which may result in insufficient sealing.

It is well known in the art that spin-on filter systems may be used to filter out contaminants from a fluid such as oil, water, air, or the like. A spin-on filter generally includes a housing that is hollow with a filter element disposed inside the housing. The housing may include a closed end and an open end with the open end allowing for the fluid to enter the housing, contact the filter element, and then be discharged from the housing. A gasket may be utilized for effecting a seal between the filter housing and the filter head. The gasket seal prevents leakage of the fluid as it passes from the filter head to the filter housing and then back out.

In some spin-on filter systems, the gasket must be stretched and placed into a groove within the filter head where it must be retained while the spin-on filter engages a threaded portion of the filter head and is screwed into place until it contacts the gasket to form a seal. One disadvantage of this system is that often times the filter head must be mounted in a position which causes the gasket to fall out of the groove in the filter head. Additionally, this can cause the gasket to fail in making a proper seal resulting in leaks and an ineffective filtration system.

What is needed, then, is a gasket that may be utilized to remain in place during installation to create a suitable seal between a filter housing and filter head.

BRIEF SUMMARY OF THE INVENTION

Briefly, the present invention relates, in one optional embodiment, to a sealing gasket for a spin-on filter element. The gasket may include an annular member having an upper sealing body and a lower sealing body. The upper sealing body may include an upper sealing surface, an inner peripheral wall and an outer peripheral wall with respect to the central axis of the annular member. The lower sealing member may include a lower sealing surface, an inner extending member and an outer extending member with respect to a central axis of the annular member. The gasket may include an annular groove formed between the inner extending member and outer extending member.

In some optional embodiments, the sealing gasket may include an upper sealing surface that is flat and configured to contact a filter element mount.

In some optional embodiments, the sealing gasket may include inner and outer peripheral walls extending downwardly from the upper sealing surface.

In some optional embodiments, the sealing gasket may include an upper sealing body comprising a first chamfered surface and a second chamfered surface. The first chamfered surface may be defined radially inwardly from an inner edge of the upper sealing surface to an upper edge of the inner peripheral wall. The second chamfered surface may be defined radially outwardly from an outer edge of the upper sealing surface to an upper edge of the outer peripheral wall.

In some optional embodiments, the sealing gasket may include the second chamfered surface having a length greater than a length of the first chamfered surface. The second chamfered surface length may be defined from the outer edge of the upper sealing surface to the upper edge of the outer peripheral wall. The first chamfered surface length may be defined from the inner edge of the upper sealing surface to the upper edge of the inner peripheral wall.

In some optional embodiments, the sealing gasket may include the second chamfered surface having an angle greater than an angle of the first chamfered surface. The second chamfered surface angle being defined by the intersection of the second chamfered surface and a plane parallel to the upper sealing surface. The angle of the first chamfered surface being defined by the intersection of the first chamfered surface and the plane parallel to the upper sealing surface.

In some optional embodiments, the sealing gasket may include the first chamfered surface having an angle in a range from 48 to 52 degrees and the second chamfered surface having a range from 50 to 55 degrees.

In some optional embodiments, the sealing gasket may include inner and outer extending members which include an external surface and an internal surface with respect to the annular groove.

In some optional embodiments, the sealing gasket may include the upper sealing body comprising a first dimension defined by a distance between the inner peripheral wall and outer peripheral wall. The lower sealing body may comprise a second dimension defined by a distance between an external surface of the inner extending member and an external surface of the outer extending member. The second outer diameter may be greater than the first outer diameter.

In some optional embodiments, the sealing gasket may include the inner extending member having a lower lip projecting toward the annular groove, the lower lip being configured to contact the spin-on filter element.

In some optional embodiments, the sealing gasket may include the lower lip of the inner extending member projecting towards the annular groove at an angle in a range of from 40 to 50 degrees to the central axis.

In some optional embodiments, the sealing gasket may include the outer extending member having a lower lip projecting toward the annular groove, the lower lip being configured to contact the spin-on filter element.

In some optional embodiments, the sealing gasket may include the lower lip of the outer extending member projects toward the annular groove at an angle in a range of from 40 to 50 degrees to the central axis.

In some optional embodiments, the sealing gasket may include the lower lip of the inner extending member and the lower lip of the outer extending member located opposite each other creating an opening communicated with the annular groove.

In some optional embodiments, the sealing gasket may include the annular groove having an interior surface configured to contact the spin-on filter element, and the lower sealing surface is a part of the interior surface.

In some optional embodiments, the sealing gasket may include the interior surface comprising a first interior wall opposite a second interior wall, the first interior wall and second interior wall being connected via the lower sealing surface.

In some optional embodiments, the sealing gasket may include the interior surface comprising an interior chamfered surface defined radially outwardly from an outer edge of the lower sealing surface to the upper edge of the second interior wall.

In some optional embodiments, a filtration system comprises a filter head, a filter housing, and an annular gasket. The filter head may include an annular recess. The filter housing may have a defined circumference with the filter housing including a lip disposed about the circumference. The annular gasket may be disposed between the filter head and filter housing. The gasket may have a filter housing retainer and a filter head insertion end, wherein the filter housing lip is received in the filter housing retainer, the filter head insertion end is received in the annular recess of the filter head, and the filter housing is retained against the filter head with the annular gasket creating a fluid seal.

In some optional embodiments, the filtration system may include the filter housing retainer comprising a first and second opposing axially extending member, the first extending member having a first engagement surface and the second extending member having a second engagement surface.

In some optional embodiments, the filtration system may include the first engagement surface defined on a first lower lip of the first axially extending member. The first lower lip may project toward the second opposing axially extending member. The second engagement surface may be defined on a second lower lip of the second axially extending member. The second lower lip may project toward the first opposing axially extending member.

In some optional embodiments, the filtration system may include the first and second engagement surfaces contacting the filter housing lip to secure the annular gasket to the filter housing.

DETAILED DESCRIPTION OF THE INVENTION

Reference will now be made in detail to embodiments of the present invention, one or more drawings of which are set forth herein. Each drawing is provided by way of explanation of the present invention and is not a limitation. In fact, it will be apparent to those skilled in the art that various modifications and variations can be made to the teachings of the present invention without departing from the scope of the invention. For instance, features illustrated or described as part of one embodiment can be used with another embodiment to yield a still further embodiment.

Thus, it is intended that the present invention covers such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention.

Throughout the description of the preferred embodiments various directional references will be used for convenience: the direction toward the filter head is "upward;" the direction toward the closed end of the filter housing is "downward"; the direction away from the central axis of the filter housing is "outward"; and the direction toward the central axis of the filter housing is "inward."

Unless specifically stated otherwise, any part of the sealing gasket of the present invention may be made of any suitable material including, but not limited to, rubber, nitrile rubber, synthetic rubber, polymer, fluoropolymer elastomer, polymer mixture, silicone, neoprene, VITON®, and the like, or any combination thereof. Additionally, some parts may be made of one material while another part is made of a separate material.

Figure 1:
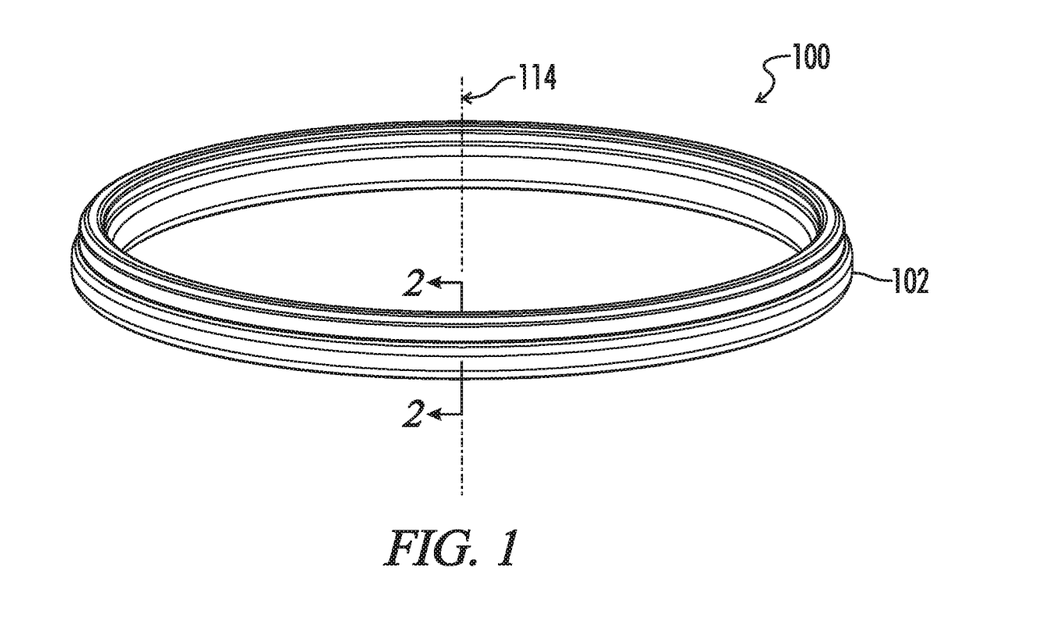
FIG. 1 is a perspective view of one embodiment of the sealing gasket.
Figure 2:
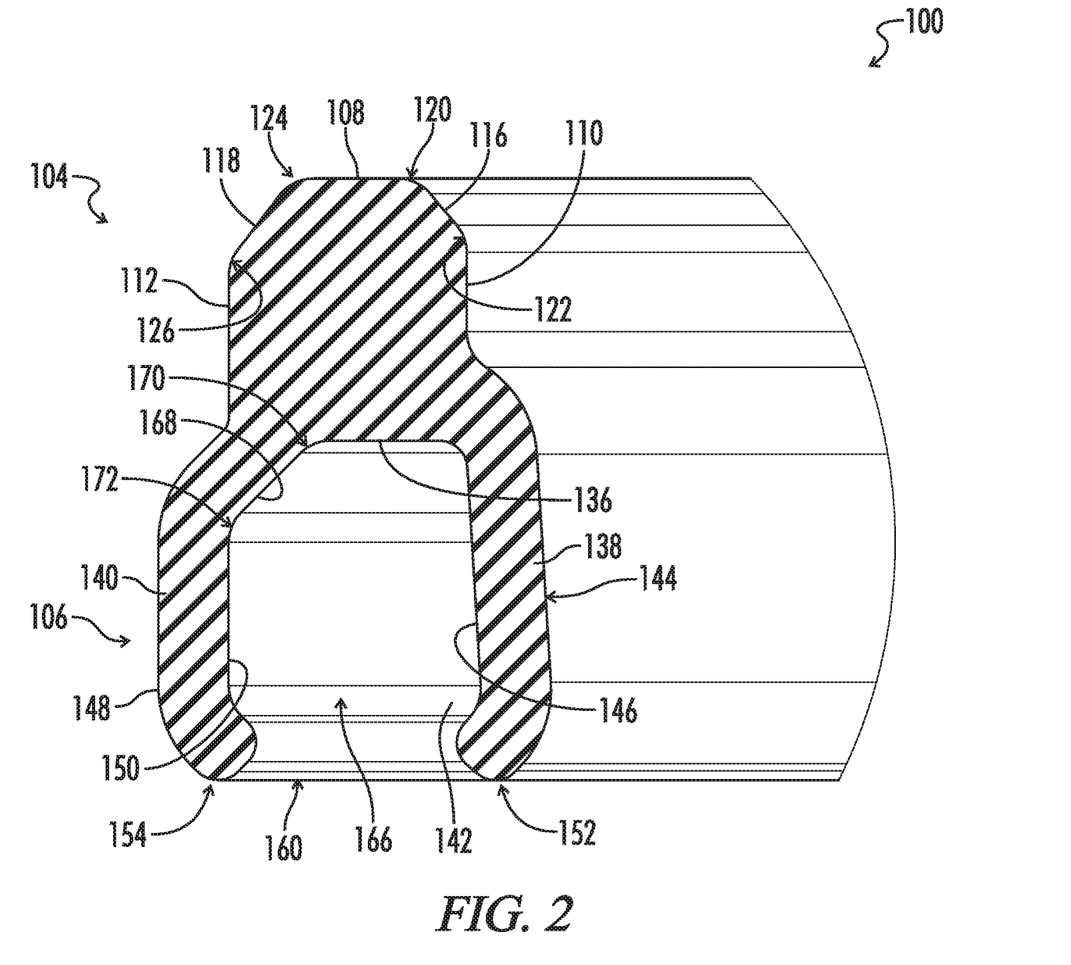
FIG. 2 is a cross-sectional view of FIG. 1.

Referring particularly to FIGS. 1 and 2, a gasket 100 is shown which may include an annular-shaped member 102. The annular member 102 may have a diameter in the range of 4.5 to 5.5 inches. More preferably, the annular member 102 may have a diameter of 5.199 inches when measured from the outermost surface on opposing sides.

Figure 5:
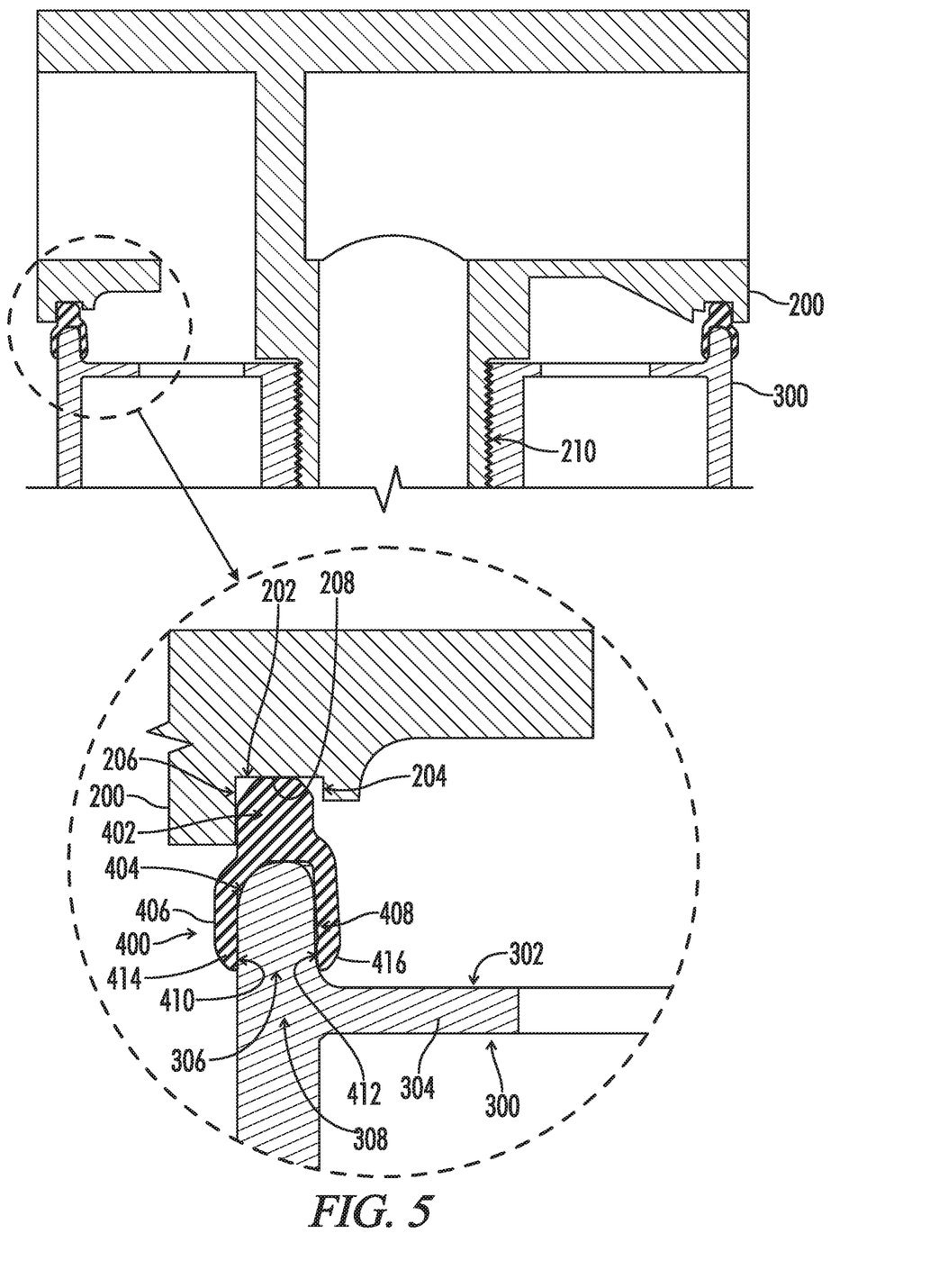
FIG. 5 is a cross-sectional view of the filtration system.

The gasket may have an upper sealing body 104 and a lower sealing body 106. The upper sealing body 104 may include an upper sealing surface 108 which may contact the filter head 200 (as shown in FIG. 5) so as to form a seal which inhibits the passage of fluid or other debris from the interior to the exterior and vice versa. The upper sealing surface 108 may be substantially flat and in a parallel plane with the filter head 200. Additionally, the upper sealing body 104 may include inner and outer peripheral walls 110, 112 with respect to the central axis 114 of the annular member 102.

The inner and outer peripheral walls 110, 112 may generally extend downwardly from the upper sealing surface 108. Referring to FIG. 2, some embodiments may include at least one chamfered surface on the upper sealing body 104. Preferably, the upper sealing body 104 has two chamfered surfaces. The first chamfered surface 116 is defined radially inwardly from the inner edge 120 of the upper sealing surface 108 to the upper edge 122 of the inner peripheral wall 110. The second chamfered surface 118 is defined radially outwardly from the outer edge 124 of the upper sealing surface 108 to the upper edge 126 of the outer peripheral wall 112. The chamfered surfaces allow for the manufacturing tolerances of the filter head 200 and the filter housing 300. The manufacturing tolerances allow for some variability in the specifications of the filter heads and filter housings when they are created. The chamfered surfaces allow for the gaskets 100 to compensate for any misalignments due to the tolerances while still creating a suitable seal between the surfaces.

Additionally, the chamfers 116, 118 decrease the surface area of the upper sealing surface 108. The decrease in surface area at the contact point between the upper sealing surface 108 and the filter head 200 decreases the force, or torque, required to compress the gasket 100 and create an adequate seal compared to wider contact surfaces. By decreasing the force required, less shear strain is applied to the gasket, which reduces the chance the gasket tears, leaks, becomes dislodged, or generally fails in making an adequate seal.

Figure 4:
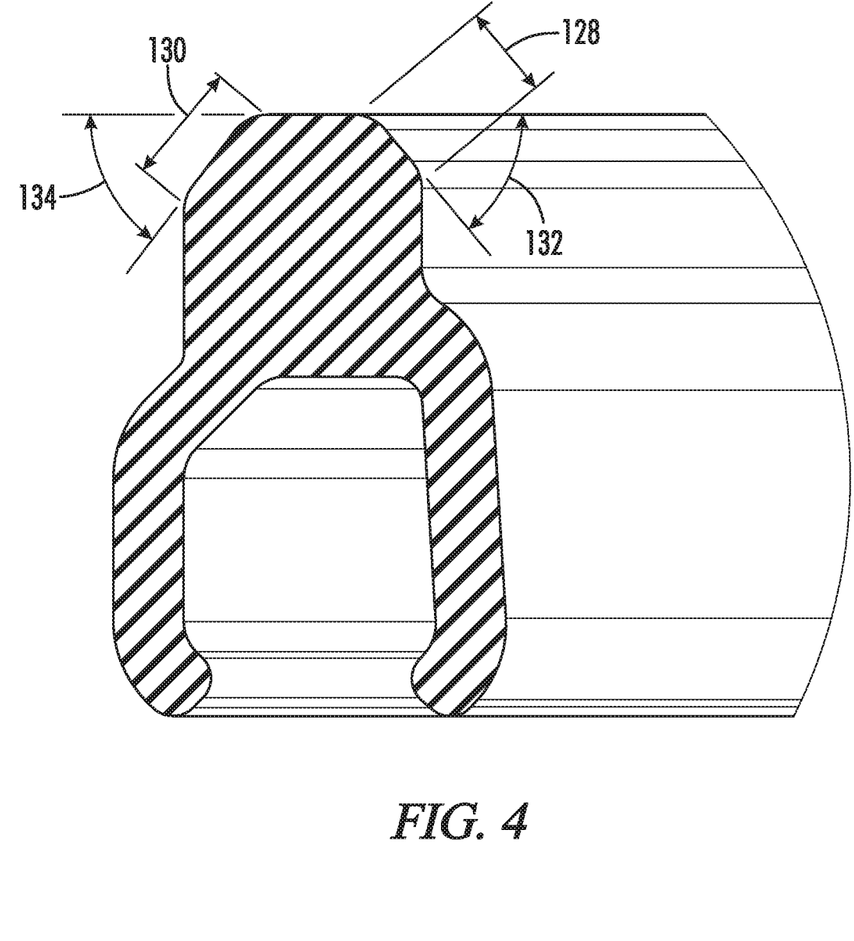
FIG. 4 is another cross-section view of FIG. 1.

Regarding FIG. 4, in one embodiment, the chamfered surfaces 116, 118 are different lengths. The second chamfered surface 118 may have a greater length than the first chamfered surface 116. The first chamfered surface's length 128 may be defined from the inner edge 120 of the upper sealing surface 108 to the upper edge 122 of the inner peripheral wall 110. The second chamfered surface's length 130 may be defined from the outer edge 124 of the upper sealing surface 108 to the upper edge 126 of the outer peripheral wall 112. In some embodiments, the length of the first chamfered surface 116 may be in a range from 0.025 to 0.045 inches, and the length of the second chamfered surface 118 may be in a range from 0.035 to 0.055 inches. More preferably, the first chamfered surface may be in a range from 0.030 to 0.040 inches, and the second chamfered surface 118 may be in a range from 0.040 to 0.050 inches. Even more preferably, the first chamfered surface 116 may be 0.035 inches and the second chamfered surface 118 may be 0.045 inches.

As shown in FIG. 4, in one embodiment, the chamfered surfaces 116, 118 have different angles with respect to the plane of the upper sealing surface 108. In one preferred embodiment, the second chamfered surface's angle 134 is greater than the first chamfered surface's angle 132. The first chamfered surface's angle 132 may be defined by the intersection of the first chamfered surface 116 and the plane parallel to the upper sealing surface 108. The first chamfered surface angle 132 may be in a range from 48 to 52 degrees, more preferably 50 degrees. The second chamfered surface angle 134 may be in a range from 50 to 55 degrees, more preferably 52.5 degrees.

The lower sealing body 106 of the annular member 102 may include a lower sealing surface 136 which may contact and create a seal to the filter housing 300 which may inhibit the passage of fluid or other debris from the interior to the exterior and vice versa. In addition, the lower sealing body 106 may include at least one extending member 138, 140 extending generally downwardly. In one embodiment, the lower sealing body may include an inner extending member 138 and outer extending member 140 with respect to the central axis 114 of the gasket 100, and an annular groove 142 formed between the inner extending member 138 and outer extending member 140.

In one embodiment, the inner extending member 138 and outer extending member 140 may each have a lower lip 152, 154. Both the inner and outer extending member's lower lip 152, 154 may project toward the annular groove 142. In one embodiment, the inner lower lip 152 and outer lower lip 154 may project inward at the same angle. In another embodiment, they may project at different angles. The angle 156, 158 may be in a range from 40 to 50 degrees relative to the central axis 114. More preferably, the angle 156, 158 may be 45 degrees relative to the central axis 114.

The inward angles 156, 158 of the lower lips are advantageous because they may allow the gasket 100 to contact the filter housing 300 with enough force to reduce the likelihood of the gasket from dislodging, falling, moving, or generally not sealing properly. The inner and outer extending members 138, 140 with the lower lips 152, 154, in conjunction with the chamfered surfaces 116, 118, ensure that the gasket 100 remains in a proper location during installation of the filter housing 300 to the filter head 200. This creates an advantage over the prior art with the gasket 100 failing to be properly placed during installation.

In one embodiment, the inner extending member lower lip 152 and outer extending lower lip 154 are located opposite each other creating an opening 160 communicated with the annular groove 142. The width 162 of the interior opening 160 in comparison to the width 164 of the annular groove 142 is smaller thus creating a small interior opening 160 when compared to the width of the annular groove 142.

The annular groove 142 may have an interior surface 166 configured to contact the filter housing 300. This interior surface 166 may also be the lower sealing surface 136. In one embodiment, the interior surface 166 may comprise a first interior wall 146 opposite a second interior wall 150. The first and second interior walls 146, 150 may be connected via the lower sealing surface 136. The interior surface 166 may also comprise an interior chamfered surface 168. The interior chamfered surface 168 may be defined radially outwardly from the outer edge 170 of the lower sealing surface 136 to the upper edge 172 of the second interior wall 150. The interior chamfered surface 168 may be shaped so that it follows the structure of the filter housing 300 to reduce any air pockets getting between the gasket 100 and housing. Further, the interior chamfered surface 168 may be shaped to provide additional sealing surfaces for when the filter housing 300 engages and is retained onto the filter head 200.

Figure 3:
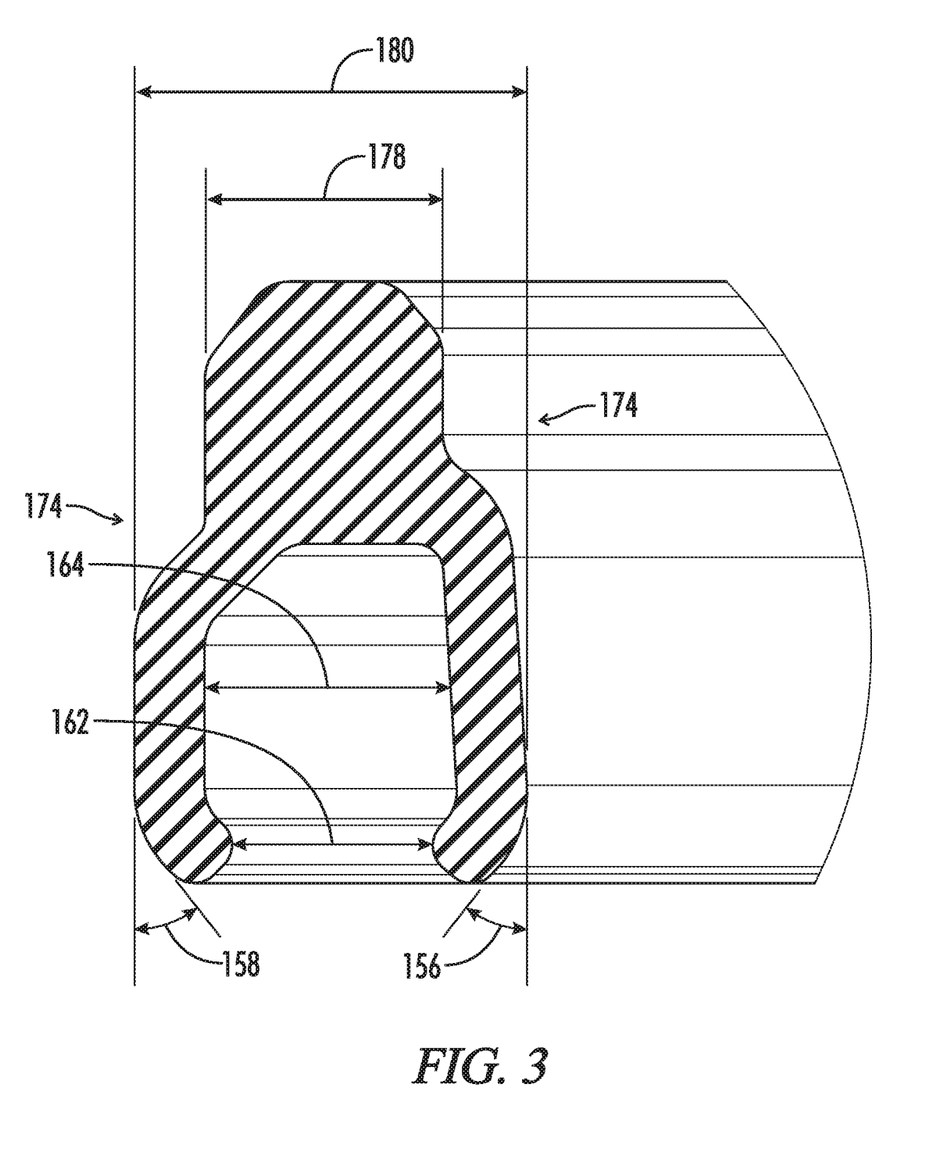
FIG. 3 is another cross-sectional view of FIG. 1.

As shown in FIG. 3, in one embodiment, the diameter 180 of the lower sealing body 106 cross-section may be greater than the diameter 178 of the upper sealing body 108 cross-section. The upper sealing body 104 may comprise a first dimension 178 measured by the distance between the inner peripheral wall 110 and outer peripheral wall 112. The lower sealing body 106 may comprise a second dimension 180 measured by the distance between the external surface 144 of the inner extending member 138 and the external surface 148 of the outer extending member 140. The intersection of the wider second dimension 180 with the narrower first dimension 178 creates a shoulder 174 between the upper sealing body 104 and lower sealing body 106. In some embodiments, this shoulder may contact the filter head 200 and act as a further sealing component between the interior and exterior of the filter housing 300.

In some embodiments, the invention may include a filtration system which comprises a filter head 200, a filter housing 300, and an annular gasket 400. The annular gasket 400 is disposed between the filter head 200 and the filter housing 300.

The filter head 200 may include an annular recess 202 which receives the filter head insertion end 402 of the annular gasket 400. The annular recess 202 may include two horizontally opposed walls 204, 206 connected by a transverse sealing surface 208. The sealing surface 208 contacts the filter head insertion end 402 of the annular gasket 400 and creates a seal when the annular gasket is compressed due to the forces applied by the filter housing 300.

The filter housing 300 may include a spin-on style housing which contains a filter element within the housing (not shown). The filter housing 300 may have an open end 302 which includes a perforated end plate 304. The filter housing may include a central threaded opening which threads onto a threaded receiving portion 210 of the filter head. The filter housing 300 is generally a circular housing which may comprise a lip 306 disposed about the outer edge 308 of the circumference at the open end 302.

The annular gasket 400 may be disposed between the filter head 200 and filter housing 300. The annular gasket 400 may comprise a filter housing retainer 404 which is configured to receive the filter housing lip 306. The filter housing retainer 404 may include a first extending member 406 which is axially opposed about a second extending member 408. The first extending member 406 may have a first engagement surface 410, and the second extending member 408 may have a second engagement surface 412. The first engagement surface 410 may be defined on a first lower lip 414 of the first extending member 406 and may engage the filter housing lip 306. The first lower lip 414 may project toward the second opposing extending member 408. The second engagement surface 412 may be defined on the second lower lip 416 of the second extending member 408 and may engage the filter housing lip 306. The second lower lip 416 may project toward the first opposing extending member 406. The engagement of the first and second engagement surfaces 410, 412 enables the annular gasket 400 to remain stable and in place during installation of the gasket and filter housing 300 onto the filter head 200.

The filter housing 300 may be retained by the filter head 200 using the threaded portion to secure the housing. While being secured, the filter housing 300 exerts a force on the annular gasket 400 which creates a fluid seal. During installation, a gasket may have the tendency to be dislodged, however the engagement of the first and second surfaces 410, 412 of the annular gasket 400 stabilize the gasket during installation and reduce the likelihood of the gasket failing to seal.

Thus, although there have been described particular embodiments of the present invention of a new and useful it is not intended that such references be construed as limitations upon the scope of this invention except as set forth in the following claims.

What is claimed is:

1. A sealing gasket for a spin-on filter element, comprising:
   an annular member having an upper sealing body and a lower sealing
   body, the upper sealing body including:
     an upper sealing surface; and
     an inner peripheral wall and an outer peripheral wall with respect to a central axis of the annular member;
   the lower sealing body including:
   a lower sealing surface;
     an inner extending member and an outer extending member with respect to the central axis of the annular member;
     an annular groove formed between the inner extending member and outer extending member; and
     a first chamfered surface and a second chamfered surface, the first chamfered surface defined radially inwardly from an inner edge of the upper sealing surface to an upper edge of the inner peripheral wall, the second chamfered surface defined radially outwardly from an outer edge of the upper sealing surface to an upper edge of the outer peripheral wall wherein the second chamfered surface has a length greater than a length of the first chamfered surface, the length of the second chamfered surface is defined from the outer edge of the upper sealing surface to the upper edge of the outer peripheral wall, and the length of the first chamfered surface is defined from the inner edge of the upper sealing surface to the upper edge of the inner peripheral wall.

2. The sealing gasket of claim 1, wherein the upper sealing surface is flat and configured to contact a filter element mount.

3. The sealing gasket of claim 1, wherein the inner and outer peripheral walls extend downwardly from the upper sealing surface.

4. The sealing gasket of claim 1, wherein the second chamfered surface has an angle greater than an angle of the first chamfered surface, the angle of the second chamfered surface is defined by the intersection of the second chamfered surface and a plane parallel to the upper sealing surface, and the angle of the first chamfered surface is defined by the intersection of the first chamfered surface and the plane parallel to the upper sealing surface.

5. The sealing gasket of claim 4, wherein the angle of the first chamfered surface is in a range from 48 to 52 degrees and the angle of the second chamfered surface is in a range from 50 to 55 degrees.

6. The sealing gasket of claim 1, wherein the inner and outer extending members include an external surface and an internal surface with respect to the annular groove.

7. The sealing gasket of claim 1, wherein the upper sealing body comprises a first dimension defined by a distance between the inner peripheral wall and outer peripheral wall, the lower sealing body comprises a second dimension defined by a distance between an external surface of the inner extending member and an external surface of the outer extending member, and the second outer dimension is greater than the first outer dimension.

8. The sealing gasket of claim 1, wherein the inner extending member has a lower lip projecting toward the annular groove, the lower lip being configured to contact the spin-on filter element.

9. The sealing gasket of claim 8, wherein the lower lip of the inner extending member projects toward the annular groove at an angle in a range of from 40 to 50 degrees to the central axis.

10. The sealing gasket of claim 8, wherein the outer extending member has a lower lip projecting toward the annular groove, the lower lip being configured to contact the spin-on filter element.

11. The sealing gasket of claim 10, wherein the lower lip of the outer extending member projects toward the annular groove at an angle in a range of from 40 to 50 degrees to the central axis.

12. The sealing gasket of claim 11, wherein the lower lip of the inner extending member and the lower lip of the outer extending member are located opposite each other creating an opening communicated with the annular groove.

13. The sealing gasket of claim 12, wherein the opening comprises an interior opening width, the annular groove comprises an annular groove width, and the annular groove width is greater than the interior opening width.

14. The sealing gasket of claim 1, wherein the annular groove has an interior surface configured to contact the spin-on filter element, and the lower sealing surface is a part of the interior surface.

15. The sealing gasket of claim 14, wherein the interior surface comprises a first interior wall opposite a second interior wall, the first interior wall and second interior wall being connected via the lower sealing surface.

16. The sealing gasket of claim 15, wherein the interior surface comprises an interior chamfered surface defined radially outwardly from an outer edge of the lower sealing surface to the upper edge of the second interior wall.

* * * * *